(12) United States Patent
Tenkayyagaari et al.

(10) Patent No.: US 12,420,482 B2
(45) Date of Patent: Sep. 23, 2025

(54) ENERGY BEAM SYSTEMS FOR ADDITIVE MANUFACTURING MACHINES

(71) Applicant: General Electric Company, Schenectady, NY (US)

(72) Inventors: Srikanth Reddy Tenkayyagaari, Bangalore (IN); Sharath Sridhar Aramanekoppa, Bangalore (IN); Megha Navalgund, Bangalore (IN); Steven T. Slusher, West Chester, OH (US)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 17/098,485

(22) Filed: Nov. 16, 2020

(65) Prior Publication Data

US 2022/0152918 A1 May 19, 2022

(51) Int. Cl.
*B29C 64/153* (2017.01)
*B29C 64/268* (2017.01)
(Continued)

(52) U.S. Cl.
CPC .......... *B29C 64/153* (2017.08); *B29C 64/268* (2017.08); *B29C 64/282* (2017.08);
(Continued)

(58) Field of Classification Search
CPC ........................... B29C 64/268; B29C 64/286
See application file for complete search history.

(56) References Cited

U.S. PATENT DOCUMENTS

| 4,545,018 A | 10/1985 | Clements et al. |
| 5,430,666 A | 7/1995 | Deangelis et al. |

(Continued)

FOREIGN PATENT DOCUMENTS

| EP | 2643906 A1 | 10/2013 |
| EP | 3199327 A1 | 8/2017 |

(Continued)

OTHER PUBLICATIONS

Lott et al., Design of an Optical system for the In Situ Process Monitoring of Selective Laser Melting (SLM), Physics Procedia, vol. 12, 2011, pp. 683-690. https://doi.org/10.1016/j.phpro.2011.03.085.

*Primary Examiner* — Susan D Leong
(74) *Attorney, Agent, or Firm* — Wood Herron & Evans LLP

(57) ABSTRACT

An additive manufacturing system may include an additive manufacturing machine and a control system. The additive manufacturing machine may include one or more irradiation devices respectively including a beam source configured to emit an energy beam, an optical assembly that has one or more optical elements configured to focus the energy beam emitted by the beam source, a beam source sensor configured to determine a beam source sensor value from a source measurement beam representative of the energy beam prior to the energy beam passing through one or more optical elements of the optical assembly, and an optics sensor configured to determine an optics sensor value from an optics measurement beam representative of the energy beam downstream from the one or more optical elements of the optical assembly. The control system may include an irradiation control module configured to provide one or more control commands to the additive manufacturing machine (Continued)

based at least in part on the beam source sensor value and/or based at least in part on the optics sensor value.

5 Claims, 9 Drawing Sheets

(51) Int. Cl.
  *B29C 64/282* (2017.01)
  *B29C 64/286* (2017.01)
  *B29C 64/393* (2017.01)
  *B33Y 30/00* (2015.01)
  *B33Y 50/02* (2015.01)
  *B33Y 10/00* (2015.01)
(52) U.S. Cl.
  CPC .......... *B29C 64/286* (2017.08); *B29C 64/393* (2017.08); *B33Y 50/02* (2014.12); *B33Y 10/00* (2014.12); *B33Y 30/00* (2014.12)

(56) References Cited

U.S. PATENT DOCUMENTS

| | | | |
|---|---|---|---|
| 6,195,164 | B1 | 2/2001 | Thompson et al. |
| 6,824,714 | B1 | 11/2004 | Tuerck et al. |
| 8,428,092 | B2 | 4/2013 | Hayano et al. |
| 8,803,073 | B2 | 8/2014 | Philippi |
| 8,878,094 | B2 | 11/2014 | Bagavath-Singh |
| 9,114,478 | B2 | 8/2015 | Scott et al. |
| 9,486,878 | B2 | 11/2016 | Buller et al. |
| 9,921,168 | B2 | 3/2018 | Gapontsev et al. |
| 2005/0115940 | A1 | 6/2005 | Matsushita et al. |
| 2008/0277564 | A1 | 11/2008 | Wu |
| 2009/0179353 | A1 | 7/2009 | Philippi |
| 2013/0154160 | A1 | 6/2013 | Cooper |
| 2015/0177158 | A1 | 6/2015 | Cheverton |
| 2016/0082668 | A1* | 3/2016 | Perret ................... B29C 64/277 425/135 |
| 2016/0114431 | A1 | 4/2016 | Cheverton et al. |
| 2016/0184893 | A1 | 6/2016 | Dave et al. |
| 2017/0120530 | A1 | 5/2017 | Demuth et al. |
| 2017/0203512 | A1 | 7/2017 | Gold |
| 2017/0242424 | A1 | 8/2017 | Spears |
| 2018/0207750 | A1 | 7/2018 | Carter |
| 2018/0290239 | A1 | 10/2018 | Haro Gonzalez et al. |
| 2019/0015933 | A1 | 1/2019 | Coeck |
| 2019/0061253 | A1 | 2/2019 | Zeulner et al. |
| 2019/0134748 | A1 | 5/2019 | Roychowdhury et al. |
| 2019/0240906 | A1* | 8/2019 | Zeulner .................. B33Y 30/00 |
| 2020/0306880 | A1* | 10/2020 | Vorontsov .......... B23K 26/0648 |

FOREIGN PATENT DOCUMENTS

| | | |
|---|---|---|
| EP | 3351323 A1 | 7/2018 |
| JP | 2012/174720 A | 9/2012 |
| WO | WO2019/014290 A1 | 1/2019 |
| WO | WO2019/094110 A1 | 5/2019 |

* cited by examiner

ENERGY BEAM SYSTEMS FOR ADDITIVE MANUFACTURING MACHINES

FIELD

The present disclosure generally pertains to energy beam systems for additive manufacturing machines.

BACKGROUND

Additive manufacturing machines may utilize an energy beam system to solidify build material and thereby additively manufacture three dimensional objects. Typically, an energy beam system of an additive manufacturing machine may undergo calibration procedures at various times. Often times, these calibration procedures may be performed manually by an service technician. Such calibration procedures may be time-intensive and cumbersome. Meanwhile, the quality of the calibration resulting from such calibration procedures may ultimately impact the operating performance of the additive manufacturing machine and/or the resulting quality of the three dimensional components produced by the additive manufacturing machine.

Accordingly, there exists a need for improved apparatuses, systems, and methods for calibrating energy beam systems used in additive manufacturing machines to additively manufacture three dimensional objects.

BRIEF DESCRIPTION

Aspects and advantages will be set forth in part in the following description, or may be apparent from the description, or may be learned through practicing the presently disclosed subject matter.

In one aspect, the present disclosure embraces additive manufacturing systems. An exemplary additive manufacturing system may include an additive manufacturing machine and a control system. The additive manufacturing machine may include one or more irradiation devices respectively including a beam source configured to emit an energy beam, an optical assembly that has one or more optical elements configured to focus the energy beam emitted by the beam source, a beam source sensor configured to determine a beam source sensor value from a source measurement beam representative of the energy beam prior to the energy beam passing through one or more optical elements of the optical assembly, and an optics sensor configured to determine an optics sensor value from an optics measurement beam representative of the energy beam downstream from the one or more optical elements of the optical assembly. The control system may include an irradiation control module configured to provide one or more control commands to the additive manufacturing machine based at least in part on the beam source sensor value and/or based at least in part on the optics sensor value.

In another aspect, the present disclosure embraces methods of additively manufacturing three-dimensional objects. In some embodiments, an exemplary method may include determining an operation control command for an irradiation device comprising a beam source and an optical assembly, generating an energy beam with the beam source, and selectively scanning the energy beam across a portion of a build plane with a scanner. The operation control command may correspond to one or more setpoints for a beam parameter. The energy beam may be generated based at least in part on the operation control command corresponding to the one or more setpoints for the beam parameter. The build plane may include a layer of build material, and the energy beam may solidify the layer of build material to form a portion of a three-dimensional object. T the operation control command may be determined based at least in part on a beam source calibration factor and/or a beam source calibration curve determined based at least in part from a beam source sensor value. The beam source sensor value may be determined from a beam source sensor associated with the beam source. The operation control command may be determined based at least in part on an optical assembly calibration factor and/or an optical assembly calibration curve determined based at least in part from an optics sensor value determined from an optics sensor associated with the optical assembly.

Additionally, or in the alternative, an exemplary method may include determining a calibration control command corresponding to one or more setpoints for a beam parameter and generating an energy beam with an irradiation device that includes a beam source and an optical assembly. The energy beam may be generated based at least in part on the calibration control command corresponding to one or more setpoints for the beam parameter.

In some embodiments, an exemplary method may include determining a beam source sensor value with a beam source sensor configured to measure the beam parameter from a source measurement beam representative of the energy beam emitted by the beam source and upstream from the optical assembly. Additionally, or in the alternative, an exemplary method may include determining a beam source calibration factor and/or a beam source calibration curve for the beam parameter corresponding to the one or more setpoints for the beam parameter. Additionally, or in the alternative, an exemplary method may include determining an optics sensor value with an optics sensor configured to measure the beam parameter from an optics measurement beam representative of the energy beam upon having passed through one or more optical elements of the optical assembly. Additionally, or in the alternative, an exemplary method may include determining an optical assembly calibration factor and/or an optical assembly calibration curve for the beam parameter corresponding to the one or more setpoints for the beam parameter. Additionally, or in the alternative, an exemplary method may include determining an operation control command for the beam parameter. The operation control command may correspond to the one or more setpoints for the beam parameter. The operation control command may be determined based at least in part on the beam source calibration factor and/or the beam source calibration curve. The operation control command determined based at least in part on the optical assembly calibration factor and/or the optical assembly calibration curve.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
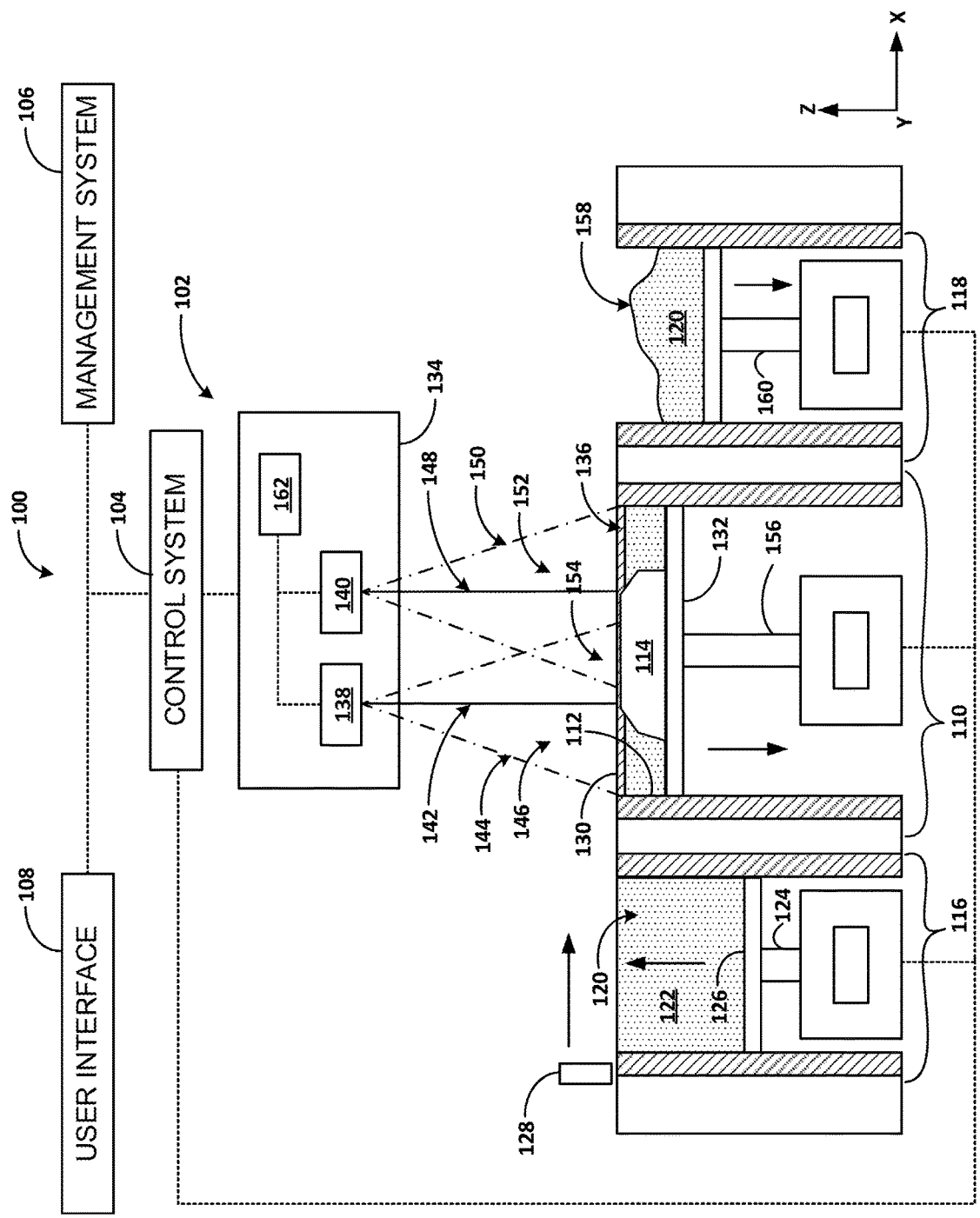
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described herein, exemplary embodiments of the present subject matter involve the use of additive manufacturing machines or methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature, and may have a variety of integral sub-components.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

Additionally or alternatively suitable additive manufacturing technologies include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology that utilizes an energy beam system and an optical assembly, including layer-additive processes, layer-subtractive processes, or hybrid processes that utilize an energy beam system and an optical assembly.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be selected based on any number of parameters and may be any suitable size according to alternative embodiments.

The present disclosure generally pertains to energy beam systems for additive manufacturing machines, including systems and methods of automatically calibrating energy beam systems, and additive manufacturing machines that include energy beam systems with sensors configured to provide sensor values that may be used to automatically calibrate one or more beam parameters associated with an energy beam system. In some embodiments, an energy beam device may include a beam source sensor configured to provide beam source sensor values associated with a beam source, and an optics sensor configured to provide optics sensor values associated with an optical assembly. Calibration factors and/or calibration curves may be determined for a beam source and/or an optical assembly. The beam source sensor values and the optics sensor values may allow calibration factors and/or calibration curves that decouple calibration factors and/or calibration curves for the beam source and the optical assembly.

Advantageously, process variables and/or corrective action can be isolated to a beam source and/or an optical assembly. Operational variability, aging, degradation, damage, or the like may be characterized and utilized to determine calibration factors and/or calibration curves on a component-by-component basis. For example, beam parameters can be determined separately for a beam source and an optical assembly. Such separate beam parameters can be utilized to determine calibration factors and/or calibration curves for a beam source and/or an optical assembly. Additionally, or in the alternative, such beam parameters can be utilized to determine control commands for a beam source and/or an optical assembly. In some embodiments, the presently disclosed subject matter may be utilized to synchronize one or more beam parameters as between a plurality of irradiation devices. Additionally, or in the alternative, drifting energy beam power may be monitored over time and data pertaining to such drifting energy beam power may be incorporated into calibration factors and/or calibration curves for an energy beam source and/or an optical assembly of an irradiation device.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130.

The additive manufacturing machine 102 includes an energy beam system 134 configured to generate one or more energy beams, such as one or more laser beams, or one or more electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical componentry configured to direct the energy beam onto the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane-region 146. The second irradiation device 140 may generate a second energy beam 148 that is scannable within a second scan field 150 incident upon at least a second build plane-region 152. The first scan field 144 and the second scan field 150 may overlap such that the first build plane-region 146 scannable by the first energy beam 142 overlaps with the second build plane-region 152 scannable by the second energy beam 148. The overlapping portion of the first build plane-region 146 and the second build plane-region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane-region 146 and the second build plane-region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powdered material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include a monitoring system 162. The monitoring system 162 may include one or more sensors configured to detect a monitoring beam (not shown) such as a portion of an energy beam directed to the one or more sensors by way of a beam splitter, and to determine one or more beam parameters associated with energy beam and/or the energy beam system 134 the sequential layers of the powder bed 136 based at least in part on the detected monitoring beam. For example, the one or more beam parameters associated with energy beam and/or the energy beam system 134 may include irradiation parameters, such as irradiation parameters including or pertaining to beam power, intensity, intensity profile, spot size, spot shape, and so forth. Additionally, or in the alternative, the one or more beam parameters associated with energy beam and/or the energy beam system 134 may include optical parameters, such as optical parameters including or pertaining to focal length, parallelism, angle tolerance, power error, irregularity, surface finish, index of refraction, Abbe number, and so forth. The one or more beam parameters determined by the monitoring system 162 may be utilized, for example, by the control system 104, to calibrate one or more beam parameters of an energy beam system 134, of an additive manufacturing machine 102, and/or of the additive manufacturing system 100. Additionally, or in the alternative, the one or more beam parameters determined by the monitoring system 162 may be utilized, for example, by the control system 104, to control one or more beam parameters of an energy beam system 134, of an additive manufacturing machine 102, and/or of the additive manufacturing system 100.

The monitoring system 162 may include componentry integrated as part of an energy beam system 134, and/or as part of an additive manufacturing machine 102. Additionally, or in the alternative, a monitoring system 162 may include componentry that is provided separately from the energy beam system 134 and/or separately from the additive manufacturing machine 102. For example, the monitoring system 162 may include componentry integrated as part of the energy beam system 134. Additionally, or in the alternative, the monitoring system 162 may include separate componentry, such as in the form of an assembly, that can be installed as part of the energy beam system 134 and/or as part of the additive manufacturing machine 102.

Now turning to FIG. 2, an exemplary energy beam system 134 will be described. As shown, an exemplary energy beam system 134 may include one or more irradiation devices, such as a first irradiation device 138 and a second irradiation device 140. The energy beam system 134 may include one or more monitoring systems 162, such as a first monitoring system 162 associated with the first irradiation device 138, and/or a second monitoring system 162 associated with the second irradiation device 140. An exemplary irradiation device 138, 140 may include an energy beam source 200 and an optical assembly 202. The energy beam source 200 may include a laser diode or a laser diode array configured to generate one or more laser beams suitable for use in an additive manufacturing process. The energy beam source 200 may emit an energy beam 142, 148. At least a portion of an energy beam 142, 148 emitted by the energy beam source 200 may pass through the optical assembly 202. The optical assembly 202 may include one or more optical elements configured to focus, shape, or otherwise conform the energy beam 142, 148 emitted by the energy beam source 200. By way of example, the optical assembly 202 may include one or more lenses, filters, apertures, mirrors, or the like. The energy beam 142, 148 passing through the optical assembly 202 may become incident upon a scanner 204 configured to scan the energy beam 142 148 to specified locations of the build plane 130.

Figure 2:
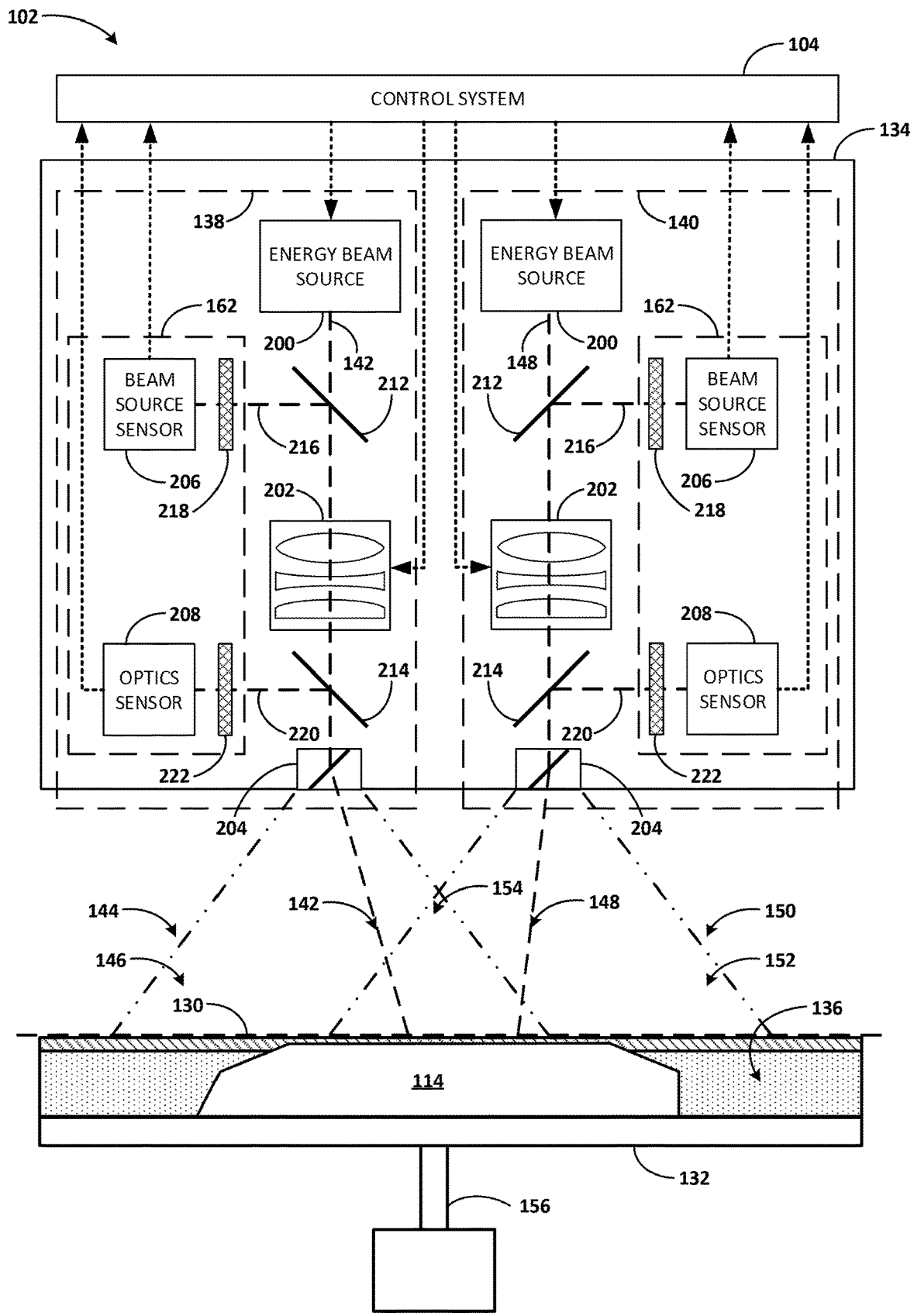
FIG. 2 schematically depicts an exemplary energy beam system.

As shown in FIG. 2, an exemplary energy beam system 134 may include a beam source sensor 206 and/or an optics sensor 208. A portion of the energy beam 142, 148 emitted from the energy beam source 200 may be directed to the beam source sensor 206. A source measurement beam splitter 212 may be disposed in a beam path of the energy beam 142, 148 downstream from the energy beam source 200 and upstream from one or more components of the optical assembly 202. For example, the source measurement beam splitter 212 may be disposed between the energy beam source 200 and the optical assembly 202. An optics measurement beam splitter 214 may be disposed in a beam path of the energy beam 142, 148 downstream from one or more optical elements of the optical assembly 202 and upstream from the scanner 204. For example, the optics measurement beam splitter 213 may be disposed between the optical assembly 202 and the scanner 204.

The source measurement beam splitter 212 may split a portion of the energy beam 142, 148 emitted from the energy beam source 200, providing a source measurement beam 216. The source measurement beam 216 split by the source measurement beam splitter 212 may be directed along a beam path incident upon the beam source sensor 206. One or more source measurement optical elements 218 may be disposed along the beam path between the source measurement beam splitter 212 and the beam source sensor 206. By way of example, the one or more source measurement optical elements 218 may include one or more lenses, filters, apertures, mirrors, beam splitters, or the like. The one or more source measurement optical elements 218 may be configured to direct the source measurement beam 216 to the beam source sensor 206 and/or to provide a source measurement beam 216 having desired properties, such as a desired wavelength, focal length, diffraction pattern, intensity, or the like.

The optics measurement beam splitter 214 may split a portion of the energy beam 142, 148 having based through at least a portion of the optical assembly 202, providing an optics measurement beam 220. The optics measurement beam 220 split by the optics measurement beam splitter 214 may be directed along a beam path incident upon the optics sensor 208. One or more optics measurement optical elements 222 may be disposed along the beam path between the optics measurement beam splitter 214 and the optics sensor 208. By way of example, the one or more optics measurement optical elements 222 may include one or more lenses, filters, apertures, mirrors, beam splitters, or the like. The one or more optics measurement optical elements 222 may be configured to direct the optics measurement beam to the optics sensor 208 and/or to provide an optics measurement beam 220 having desired properties, such as a desired wavelength, focal length, diffraction pattern, intensity, or the like.

The beam source sensor 206 and/or an optics sensor 208 may be configured to determine one or more beam parameters of an energy beam 142, 148, such as one or more irradiation parameters and/or one or more optical parameters. The one or more irradiation parameters may include or pertain to beam power, intensity, intensity profile, spot size, spot shape, and so forth. The optics sensor 208 may be configured to determine one or more beam parameters associated with an optical assembly 202, such as one or more irradiation parameters and/or one or more optical parameter. The one or more optical parameters may include or pertain to focal length, parallelism, angle tolerance, power error, irregularity, surface finish, index of refraction, Abbe number, and so forth. An exemplary beam source sensor 206 and/or an exemplary optics sensor 208 may include a photo diode detector, a thermopile sensor, a pyroelectric sensor, an integrating sphere power sensor, or the like.

The beam source sensor 206 may be configured to determine one or more beam parameters of the energy beam 142, 148 emitted by the energy beam source 200. The one or more beam parameters determined by the beam source sensor 206 may be representative of the energy beam 142, 148 prior to passing through one or more optical elements of the optical assembly 202. The optics sensor 206 may be configured to determine one or more beam parameters of the energy beam 142, 148 upon having passed through one or more optical elements of the optical assembly 202. The one or more beam parameters determined by the optics sensor 206 may be representative of the energy beam 142, 148 upon having passed through one or more optical elements of the optical assembly 202.

Information from the beam source sensor 206 and the optics sensor 208 may be used to determine whether the energy beam 142, 148 exhibits a nominal state, indicating that one or more beam parameters are as intended, such as within an acceptable range of values for the respective one or more beam parameters. Additionally, or in the alternative, information from the beam source sensor 206 and the optics sensor 208 may be used to determine whether the energy beam 142, 148 exhibits an aberrant state, indicating that one or more beam parameters are not as intended, such as outside of an acceptable range of values for the respective one or more beam parameters. Information from the beam source sensor 206 and the optics sensor 208 may be used to determine differences in the energy beam 142, 148 as between parameter values determined by the beam source sensor 206 and the optics sensor 208, such as before and after passing through the one or more optical elements of the optical assembly 202. For example, in the event of an aberrant state with respect to one or more beam parameters, such as s drift in beam power, a determination can be made as to whether the aberrant state may be attributable to the energy beam source 200 (or another component or components upstream from the beam source sensor 206) or to the optical assembly 202 (or another component or components upstream from the optics sensor 208 and downstream from the beam source sensor 206). The optics sensor 208 may determine a deviation in a beam parameter, such as a drift in beam power, attributable to any components in the beam path upstream from the optics sensor 208, including the optical assembly 202 and/or the energy beam source 200. When a beam parameter exhibits a nominal state as determined by the beam source sensor 206 and an aberrant state as determined by the optics sensor 208, a determination can be made that the aberrant state may be attributable to the optical assembly 202 and/or one or more components downstream from the source measurement beam splitter 212 and upstream from the optics sensor 208.

Figure 3:
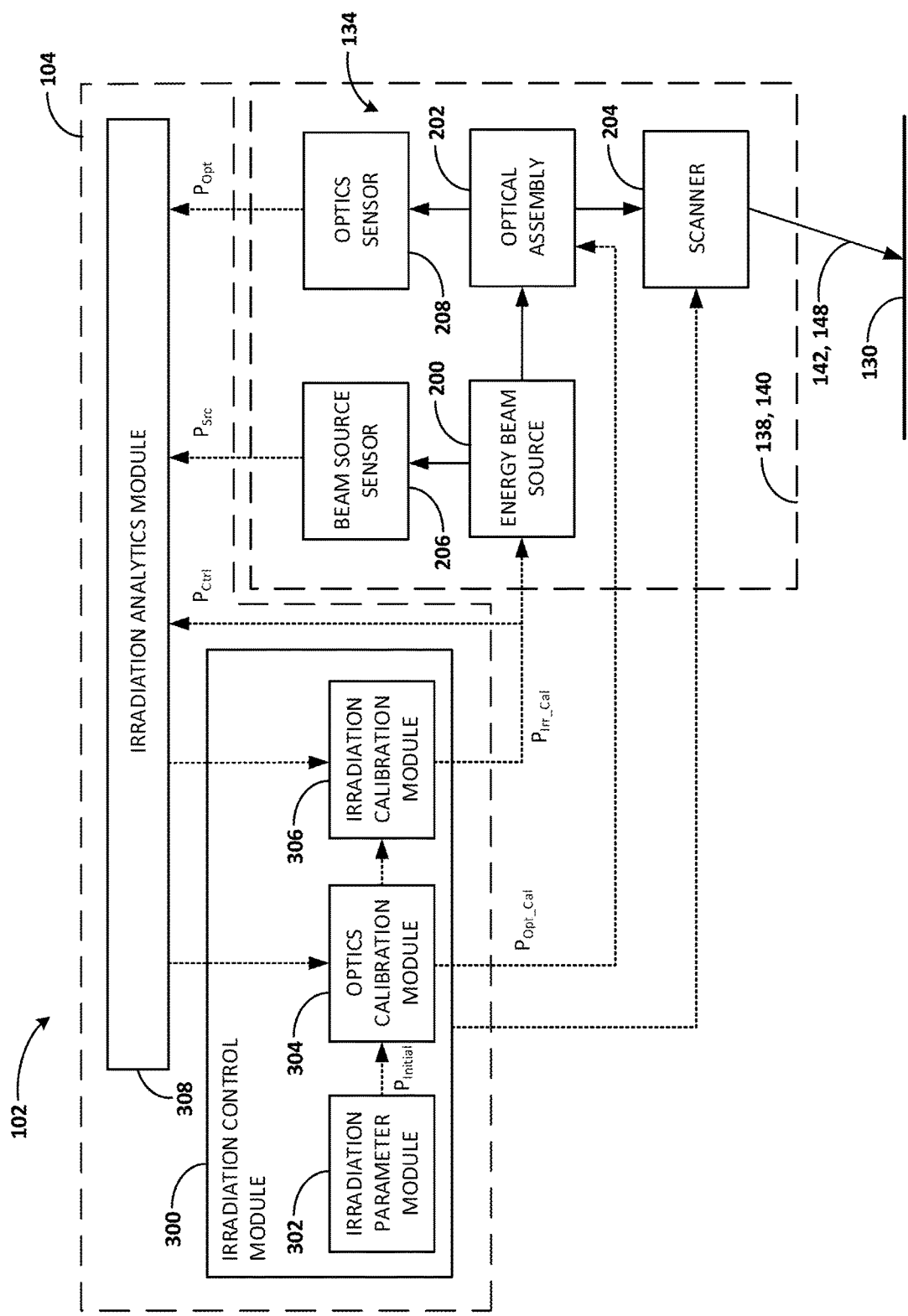
FIG. 3 schematically depicts an exemplary control regime for an energy beam system.

Now turning to FIG. 3, an exemplary control regime for an energy beam system 134 will be described. As shown, a control system 104 may include an irradiation control module 300. The irradiation control module 300 may be configured to provide control commands to an energy beam system 134. For example, the control commands may be provided to an energy beam source 200, an optical assembly 202, and/or a scanner 204. The control commands from the irradiation control module 300 may include calibration control commands configured to cause an energy beam system 134 to perform at least a portion of a calibration, such as calibrating an energy. Additionally, or in the alternative, the control commands from the irradiation control module 300 may include operation control commands configured to cause the energy beam system 134 to perform an irradiation operation such as generating an energy beam 142, 148 with an energy beam source 200, focusing an energy beam 142, 148 with an optical assembly 202, and/or scanning an energy beam 142, 148 across a build plane 130 with a scanner 204.

The irradiation control module 300 may include an irradiation parameter module 302 configured to determine a control command and/or a setpoint for one or more beam parameters. The one or more beam parameters determined by the irradiation control module 300 may include irradiation parameters, such as irradiation parameters including or pertaining to beam power, intensity, intensity profile, spot size, spot shape, and so forth. Additionally, or in the alternative, the irradiation parameter module 302 configured to determine a control command and/or a setpoint for one or more optical parameters of an optical assembly 202, such as optical parameters including or pertaining to focal length, parallelism, angle tolerance, power error, irregularity, surface finish, index of refraction, Abbe number, and so forth.

The irradiation control module 300 may include one or more calibration modules, such as an optics calibration module 304 and/or an irradiation calibration module 306. The one or more calibration modules (e.g., the one or more optics calibration module 304 and/or the one or more irradiation calibration modules 306) may be configured to determine one or more calibration factors and/or one or more calibration curves, respectively, for one or more beam parameters. An optics calibration module 304 may be configured to determine one or more optical assembly calibration factors and/or one or more optical assembly calibration curves. An optical assembly calibration factor and/or an optical assembly calibration curve may be determined for one or more beam parameters. Additionally, or in the alternative, an optical assembly calibration factor and/or an optical assembly calibration curve may be determined for one or more optical parameters, such as one or more optical parameters upon which one or more beam parameter may depend. An irradiation calibration module 306 may be configured to determine one or more beam source calibration factors and/or one or more beam source calibration curves. A beam source assembly calibration factor and/or a beam source calibration curve may be determined for one or more beam parameters.

An irradiation parameter module 302 may be configured to determine an initial setpoint for a beam parameter, such as an initial setpoint for an irradiation parameter and/or an initial setpoint for an optical parameter. The irradiation parameter module 302 may provide the initial setpoint ($P_{Initial}$) to an optics calibration module 304. Additionally, or in the alternative, the irradiation parameter module 302 may provide the initial setpoint ($P_{Initial}$) to one or more other modules of the control system 104 and/or to one or more controllable components of an energy beam system 134, such as an energy beam source 200, an optical assembly 202, a scanner 204, a beam source sensor 206, and/or an optics sensor 208.

An optics calibration module 304 may be configured to augment an initial setpoint ($P_{Initial}$) for a beam parameter, such as an irradiation parameter and/or an optical parameter, for example, based at least in part on an optical assembly calibration factor and/or an optical assembly calibration curve corresponding to the beam parameter. The optics calibration module 304 may be configured to determine an optics calibrated setpoint for a beam parameter, such as an optics calibrated setpoint for an irradiation parameter and/or an optics calibrated setpoint for an optical parameter. The optics calibration module 304 may provide the optics calibrated setpoint ($P_{Opt\_Cal}$) to an irradiation calibration module 306. Additionally, or in the alternative, the optics calibration module 304 may provide the optics calibrated setpoint ($P_{Opt\_Cal}$) to one or more other modules of the control system 104 and/or to one or more controllable components of an energy beam system 134, such as an energy beam source 200, an optical assembly 202, a scanner 204, a beam source sensor 206, and/or an optics sensor 208.

An irradiation calibration module 306 may be configured to augment an optics calibrated setpoint ($P_{Opt\_Cal}$) for a beam parameter, such as an optics calibrated setpoint for an irradiation parameter and/or an optics calibrated setpoint for an optical parameter, for example, based at least in part on a beam source calibration factor and/or a beam source calibration curve corresponding to the beam parameter. Additionally, or in the alternative, the irradiation calibration module 306 may be configured to augment an initial setpoint ($P_{Initial}$) for a beam parameter, such as an initial setpoint for an irradiation parameter and/or an initial setpoint for an optical parameter, The initial setpoint for the beam parameter may be based at least in part on a beam source calibration factor and/or a beam source calibration curve corresponding to the beam parameter. The irradiation calibration module 306 may be configured to determine an irradiation calibrated setpoint for a beam parameter, such as an irradiation calibrated setpoint for an irradiation parameter and/or an irradiation calibrated setpoint for an optical parameter. The irradiation calibration module 306 may provide the irradiation calibrated setpoint ($P_{Irr\_Cal}$) one or more controllable components of an energy beam system 134, such as an energy beam source 200, an optical assembly 202, a scanner 204, a beam source sensor 206, and/or an optics sensor 208. Additionally, or in the alternative, the irradiation calibration module 306 may provide the irradiation calibrated setpoint ($P_{Irr\_Cal}$) to one or more modules of the control system 104.

In an exemplary embodiment, the irradiation parameter module 302 may determine an initial setpoint ($P_{Initial}$) for a beam parameter and provide the initial setpoint ($P_{Initial}$) to the optics calibration module 304. The optics calibration module 304 may augment the initial setpoint ($P_{Initial}$) for the beam parameter based at least in part on an optical assembly calibration factor and/or an optical assembly calibration curve corresponding to the beam parameter. The optics calibration module 304 may determine an optics calibrated setpoint ($P_{Opt\_Cal}$) for the beam parameter and provide the optics calibrated setpoint ($P_{Opt\_Cal}$) to an irradiation calibration module 306. The irradiation calibration module 306 may augment the optics calibrated setpoint ($P_{Opt\_Cal}$) for the beam parameter based at least in part on an optical assembly calibration factor and/or an optical assembly calibration curve corresponding to the beam parameter. The irradiation calibration module 306 may determine an irradiation calibrated setpoint ($P_{Irr\_Cal}$) for the beam parameter and provide the irradiation calibrated setpoint ($P_{Irr\_Cal}$) to one or more controllable components of an energy beam system 134, such as to an energy beam source 200 and/or an optical assembly 202. The energy beam source 200 and/or the optical assembly 202 may control the beam parameter of an energy beam 142, 148, based at least in part on a beam parameter calibration factor or calibration curve and/or based at least in part on an optical assembly calibration factor or calibration curve. The beam parameter may be adjusted independently based at least in part on the beam parameter calibration factor or calibration curve, for example using the irradiation calibrated setpoint ($P_{Irr\_Cal}$), and/or based at least in part on the optical assembly calibration factor or calibration curve, for example using the optics calibrated setpoint ($P_{Opt\_Cal}$).

Additionally, or in the alternative, in an exemplary embodiment, the irradiation parameter module 302 may determine an initial setpoint ($P_{Initial}$) for an optical parameter and provide the initial setpoint ($P_{Initial}$) the optics calibration module 304. The optics calibration module 304 may augment the initial setpoint ($P_{Initial}$) for the optical parameter based at least in part on an optical assembly calibration factor and/or an optical assembly calibration curve corresponding to the optical parameter. The optics calibration module 304 may determine an optics calibrated setpoint ($P_{Opt\_Cal}$) for the optical parameter and provide the optics calibrated setpoint ($P_{Opt\_Cal}$) to one or more controllable components of an energy beam system 134, such as to an energy beam source 200 and/or an optical assembly 202. The energy beam source 200 and/or the optical assembly 202 may control the optical parameter corresponding to an energy beam 142, 148, based at least in part on an optical assembly calibration factor or calibration curve. The optical parameter may be adjusted independently based at least in part on the optical assembly calibration factor or calibration curve, for example using the optics calibrated setpoint ($P_{Opt\_Cal}$).

In some embodiments, a control system 104 may include an irradiation analytics module 308. An irradiation analytics module 308 may be configured to determine a calibration factor or calibration curve for one or more beam parameters, such as irradiation parameters and/or optical parameters, for example, based at least in part on input from a beam source sensor 206 and/or based at least in part on an input from an optics sensor 208. The calibration factor or calibration curve for the one or more beam parameters, such as irradiation parameters and/or optical parameters, may be determined based at least in part on an input from the irradiation control module 300, such as from a control command (Pod) corresponding to one or more setpoints for a beam parameter. A beam source sensor 206 may determine a beam source sensor value ($P_{Src}$), such as from a source measurement beam 216 representative of an energy beam emitted 142, 148 from an energy beam source 200. The beam source sensor 206 may provide the beam source sensor value ($P_{Src}$) to the irradiation analytics module 308. An optics sensor 208 may determine an optics sensor value ($P_{Opt}$), such as from an optics measurement beam 220 representative of an energy beam 142, 148 downstream from one or more optical elements of an optical assembly 202. The optics measurement beam 220 may be representative of the energy beam 142, 148 upstream from a scanner 204, such as between the optical assembly 202 and the scanner 204. The beam calibration factor or calibration curve for the one or more beam parameters, such as irradiation parameters and/or optical parameters, may be determined at least in party by comparing the control command ($P_{Crtl}$) corresponding to one or more setpoints for a beam parameter to the beam source sensor value ($P_{Src}$) and/or to the optics sensor value ($P_{Opt}$).

Figure 4:
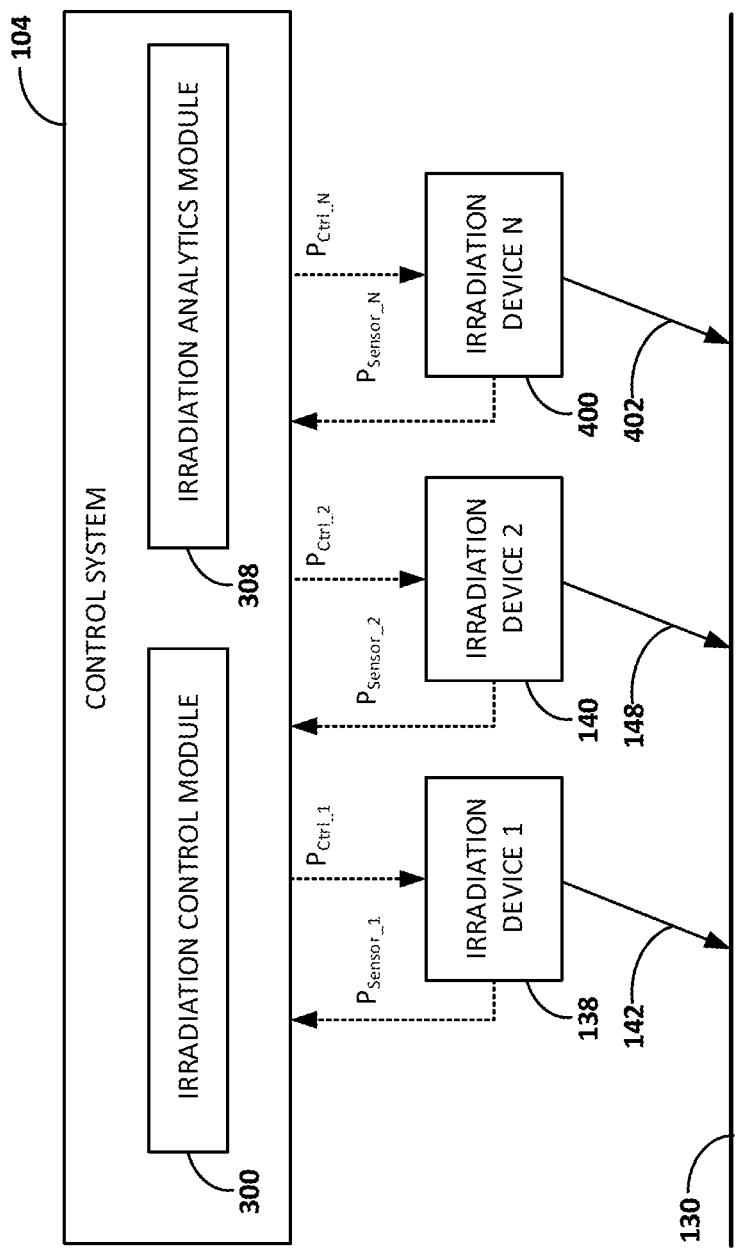
FIG. 4 schematically depicts another exemplary control regime for an energy beam system.

Now turning to FIG. 4, another exemplary control regime for an energy beam system 134 will be described. The control regime described with reference to FIG. 4 can be utilized in addition or in the alternative to the control regime described with reference to FIG. 3. As shown in FIG. 4, an exemplary additive manufacturing machine 102 may include a plurality of irradiation devices, such as a first irradiation device 138 configured to provide a first energy beam 142, and a second irradiation device 140 configured to provide a second energy beam 148. An additive manufacturing machine 102 may include any number of irradiation devices. For example, an additive manufacturing machine 102 may include an Nth irradiation device 400 configured to provide an Nth energy beam 402. The control system 102 may be configured to compare one or more operations of one or more irradiation devices 142, 148, 400 to one another. For example, such comparison may be performed by an irradiation analytics module 308. In some embodiments, an irradiation analytics module 308 may compare a first beam parameter of a first irradiation device 138 to a second beam parameter of a second irradiation device 140 and/or an Nth beam parameter of an Nth irradiation device 400. In some embodiments, one or more beam parameters may be synchronized as between a plurality of irradiation devices 138, 140, 400.

An irradiation analytics module 308 may compare one or more control commands as between a plurality of irradiation devices 138, 140, 400. For example, an irradiation analytics module 308 may compare a first control command ($P_{Ctrl\_1}$) for a first irradiation device 138 to a second control command ($P_{Ctrl\_2}$) for a second irradiation device 140 ($P_{Ctrl\_1}$) and/or to an Nth control command ($P_{Ctrl\_N}$) for an Nth irradiation device. Additionally, or in the alternative, the irradiation analytics module 308 may compare one or more sensor values, such as one or more beam source sensor values ($P_{Src}$) and/or one or more optics sensor values ($P_{Opt}$), as between a plurality of irradiation devices 138, 140, 400. For example, an irradiation analytics module 308 may compare a first sensor value ($P_{Sensor\_1}$) from a first irradiation device 138 to a second sensor value ($P_{Sensor\_2}$) from a second irradiation device 140 ($P_{Sensor\_1}$) and/or to an Nth sensor value ($P_{Sensor\_N}$) from an Nth irradiation device.

In some embodiments an irradiation analytics module 308 may compare a difference between a control command and a sensor value as between a plurality of irradiation devices 138, 140, 400. For example, an irradiation analytics module 308 may compare a difference between a first control command ($P_{Ctrl\_1}$) and a first sensor value ($P_{Sensor\_1}$) corresponding to a first irradiation device 138 to a difference between a second control command ($P_{Ctrl\_2}$) and a second sensor value ($P_{Sensor\_2}$) corresponding to a second irradiation device 140. Additionally, or in the alternative, an irradiation analytics module 308 may compare a difference between a first control command ($P_{Ctrl\_1}$) and a first sensor value ($P_{Sensor\_1}$) corresponding to a first irradiation device 138 to a difference between an Nth control command ($P_{Ctrl\_N}$) and an Nth sensor value ($P_{Sensor\_N}$) corresponding to an Nth irradiation device 400.

An irradiation analytics module 308 may determine a calibration control command and/or an operation control command for one or more irradiation devices 138, 140, 400, for example, based at least in part on a comparison of one or more operations of one or more irradiation devices 142, 148, 400 to one another. For example, a calibration control command and/or an operation control command may be determined based at least in part on a comparison of one or more beam parameters, such as irradiation parameters and/or optical parameters, as between the plurality of irradiation devices 142, 148, 400. Additionally, or in the alternative, calibration control command and/or an operation control command may be determined based at least in part on a comparison of one or more control commands as between the plurality of irradiation devices 138, 140, 400, a comparison of one or more sensor values as between the plurality of irradiation devices 138, 140, 400, and/or a comparison of a difference between a control command and a sensor value as between the plurality of irradiation devices 138, 140, 400.

Now turning to FIG. 5, an exemplary control system for an additive manufacturing machine 102 or additive manufacturing system 100 will be described. A control system 104 may be configured to perform one or more control operations. A control system 104 may be configured to output one or more control commands associated with an additive manufacturing machine 102, such as calibration control commands and/or operating control commands. The control commands may include operating control commands configured to control one or more controllable components of an additive manufacturing machine 102. The control commands may include calibration control commands configured to calibrate one or more beam parameters, such as irradiation parameters and/or optical parameters, of an additive manufacturing machine 102.

Figure 5:
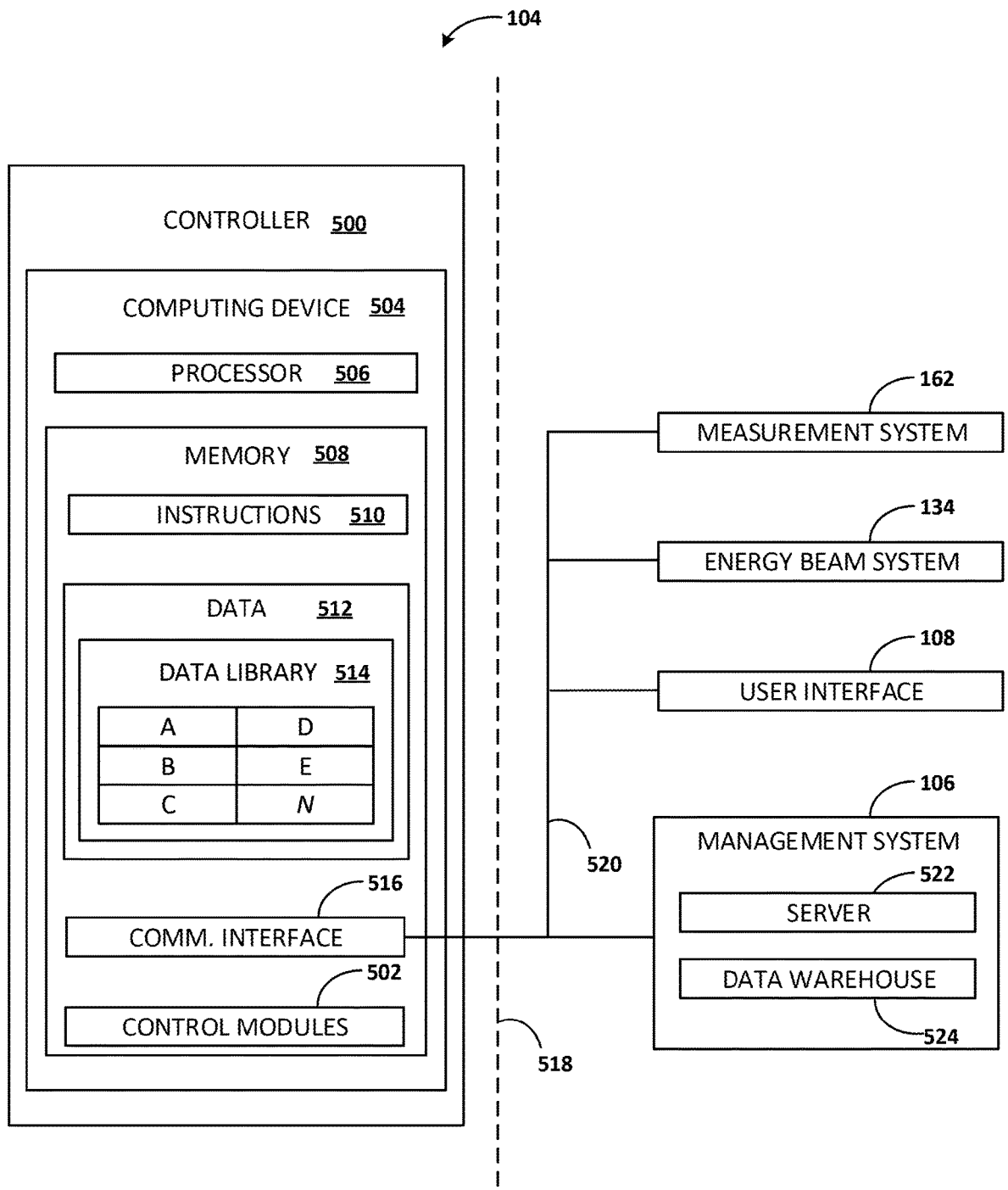
FIG. 5 schematically depicts an exemplary control system for an additive manufacturing machine or system.

As shown in FIG. 5, an exemplary control system 104 includes a controller 500. The controller may include one or more control modules 502 configured to cause the controller 500 to perform one or more control operations. For example, the one or more control modules 502 may include an irradiation control module 300 and/or an irradiation analytics module 308. The one or more control modules 502 may include control logic executable to provide control commands configured to control one or more controllable components associated with an additive manufacturing machine 102, such as controllable components associated with an energy beam system 134 and/or a measurement system 162. For example, a control module 502 may be configured to provide one or more operation control commands executable to control operation of a beam source 200, an optical assembly 202, a scanner 204, a beam source sensor 206, and/or an optics sensor 208. Additionally, or in the alternative, a control module 502 may be configured to provide one or more calibration control commands executable to control operation of one or more controllable components associated with an energy beam system 134 and/or a measurement system 162 in connection with a calibration procedure. For example, a control module 502 may be configured to provide one or more calibration control commands executable to control calibration of a beam source 200, an optical assembly 202, a scanner 204, a beam source sensor 206, and/or an optics sensor 208.

The controller 500 may be communicatively coupled with an additive manufacturing machine 102. In some embodiments, the controller 500 may be communicatively coupled with one or more components of an additive manufacturing machine 102, such as one or more components of an energy beam system 134, and/or a measurement system 162. The controller 500 may also be communicatively coupled with a management system 106 and/or a user interface 108.

The controller 500 may include one or more computing devices 504, which may be located locally or remotely relative to the additive manufacturing machine 102 and/or the measurement system 162. The one or more computing devices 504 may include one or more processors 506 and one or more memory devices 508. The one or more processors 506 may include any suitable processing device, such as a microprocessor, microcontroller, integrated circuit, logic device, and/or other suitable processing device. The one or more memory devices 508 may include one or more computer-readable media, including but not limited to non-transitory computer-readable media, RAM, ROM, hard drives, flash drives, and/or other memory devices 508.

The one or more memory devices 508 may store information accessible by the one or more processors 506, including computer-executable instructions 510 that can be executed by the one or more processors 506. The instructions 510 may include any set of instructions which when executed by the one or more processors 506 cause the one or more processors 506 to perform operations, including optical element monitoring operations, maintenance operations, cleaning operations, calibration operations, and/or additive manufacturing operations.

The memory devices 508 may store data 512 accessible by the one or more processors 506. The data 512 can include current or real-time data 512, past data 512, or a combination thereof. The data 512 may be stored in a data library 514. As examples, the data 512 may include data 512 associated with or generated by an additive manufacturing system 100 and/or an additive manufacturing machine 102, including data 512 associated with or generated by the controller 500, an additive manufacturing machine 102, an energy beam system 134, a measurement system 162, a management system 106, a user interface 108, and/or a computing device 504. Such data 512 may pertain to operation of an energy beam system 134 and/or a measurement system 162. The data 512 may also include other data sets, parameters, outputs, information, associated with an additive manufacturing system 100 and/or an additive manufacturing machine 102.

The one or more computing devices 504 may also include a communication interface 516, which may be used for communications with a communication network 518 via wired or wireless communication lines 520. The communication interface 516 may include any suitable components for interfacing with one or more network(s), including for example, transmitters, receivers, ports, controllers, antennas, and/or other suitable components. The communication interface 516 may allow the computing device 504 to communicate with various nodes on the communication network 518, such as nodes associated with the additive manufacturing machine 102, the energy beam system 134, the measurement system 162, the management system 106, and/or a user interface 108. The communication network 518 may include, for example, a local area network (LAN), a wide area network (WAN), SATCOM network, VHF network, a HF network, a Wi-Fi network, a WiMAX network, a gatelink network, and/or any other suitable communication network 518 for transmitting messages to and/or from the controller 500 across the communication lines 520. The communication lines 520 of communication network 518 may include a data bus or a combination of wired and/or wireless communication links.

The communication interface 516 may allow the computing device 504 to communicate with various components of an additive manufacturing system 100 and/or an additive manufacturing machine 102 communicatively coupled with the communication interface 516 and/or communicatively coupled with one another, including an energy beam system 134 and/or a measurement system 162. The communication interface 516 may additionally or alternatively allow the computing device 504 to communicate with the management system 106 and/or the user interface 108. The management system 106 may include a server 522 and/or a data warehouse 524. As an example, at least a portion of the data 512 may be stored in the data warehouse 524, and the server 522 may be configured to transmit data 512 from the data warehouse 524 to the computing device 504, and/or to receive data 512 from the computing device 504 and to store the received data 512 in the data warehouse 524 for further purposes. The server 522 and/or the data warehouse 524 may be implemented as part of a control system 104 and/or as part of the management system 106.

Now turning to FIG. 6, FIG. 7, and FIGS. 8A and 8B, exemplary methods of additively manufacturing a three-dimensional object will be described. The exemplary methods described with reference to FIGS. 6, 7, 8A, and 8B may include methods of calibrating one or more beam parameters of an additive manufacturing machine, such as one or more irradiation parameters and/or one or more optical parameters. Additionally, or in the alternative, the methods described with reference to FIGS. 6, 7, 8A, and 8B may include methods of operating an additive manufacturing machine and/or methods of additively manufacturing a three-dimensional object. The methods described with reference to FIGS. 6, 7, 8A, and 8B may be implemented alone or in combination with one another, and respective parts of such methods may be implemented interchangeably with one another and/or in combination with other methods of calibrating an additive manufacturing machine and/or in combination with other methods of additively manufacturing a three-dimensional object.

Figure 6:
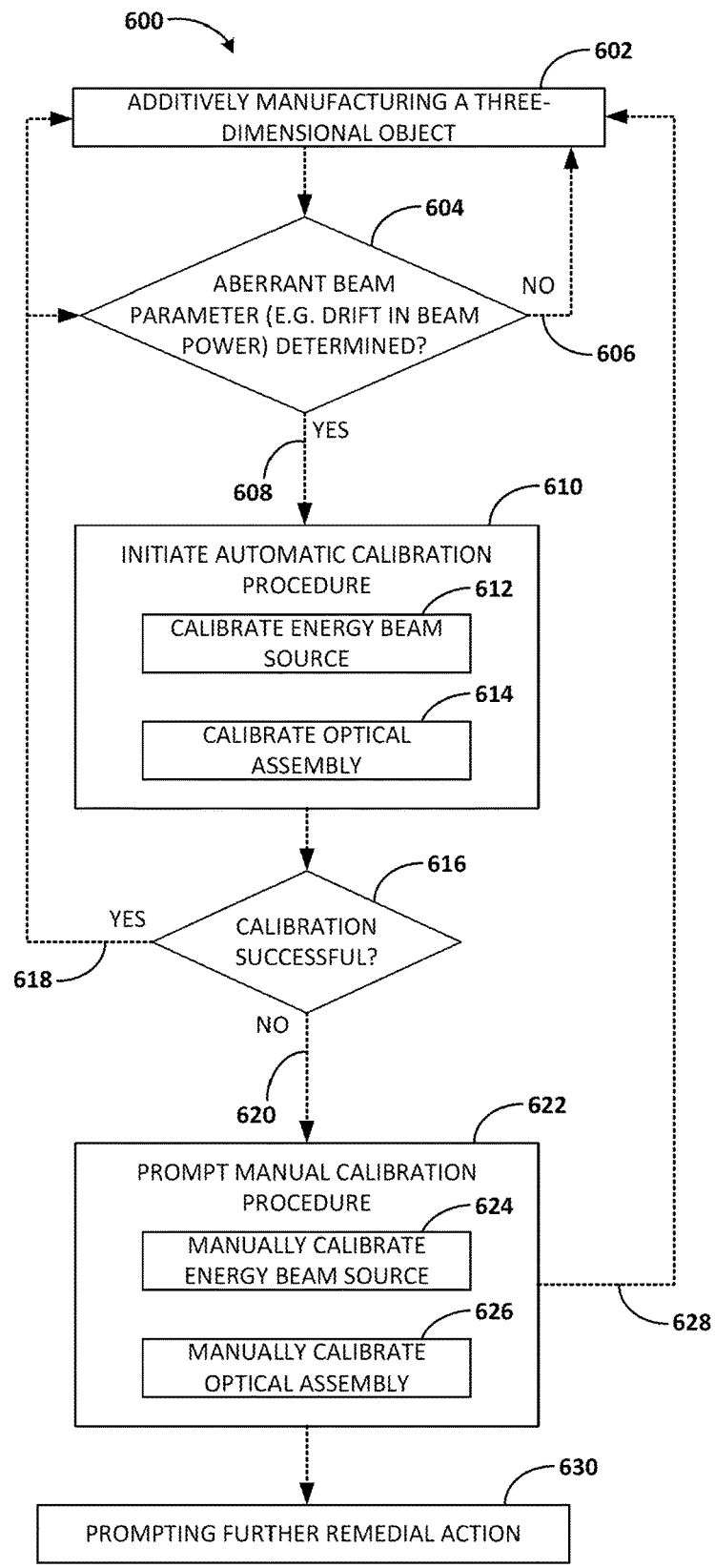
FIG. 6 schematically depicts an exemplary method of additively manufacturing a three-dimensional object.

As shown in FIG. 6, an exemplary method 600 may include, at block 602, additively manufacturing a three-dimensional object 114, and at block 604, determining an aberrant beam parameter, such as a drift in beam power. An exemplary method 600 may additionally or alternatively include determining an aberrant irradiation parameter and/or an aberrant optical parameter. When an aberrant beam parameter has not been determined, at path 606, the method 600 continues with additively manufacturing the three-dimensional object 114 at block 602. At path 608, when an aberrant beam parameter has been determined at block 604, the method proceeds with initiating an automatic calibration procedure at block 610. The automatic calibration procedure may include, at block 612, calibrating an energy beam source 200. Additionally, or in the alternative, the automatic calibration procedure may include, at block 614, calibrating an optical assembly 614.

At block 610, an exemplary method 600 may include, at block 616, determining whether the automatic calibration procedure was successful. In some embodiments, the determination as to whether the automatic calibration procedure was successful may be made based at least in part on a comparison of comparison of one or more operations of one or more irradiation devices 142, 148, 400 to one another. For example, the automatic calibration procedure may be determined successful or unsuccessful based at least in part on a comparison of one or more beam parameters, such as irradiation parameters and/or optical parameters, as between the plurality of irradiation devices 142, 148, 400, a comparison of one or more sensor values as between the plurality of irradiation devices 138, 140, 400, and/or a comparison of a difference between a control command and a sensor value as between the plurality of irradiation devices 138, 140, 400.

When an automatic calibration procedure has been determined successful, at path 618, the method 600 continues with additively manufacturing the three-dimensional object 114 at block 602. At path 620, when an automatic calibration procedure has been determined unsuccessful, the method proceeds with prompting a manual calibration procedure at block 622. The manual calibration procedure may include, at block 624, manually calibrating an energy beam source 200. Additionally, or in the alternative, the manual calibration procedure may include, at block 626, manually calibrating an optical assembly 614.

When a manual calibration procedure has been prompted, the method 600 may continue, at path 628 to further additively manufacturing the three-dimensional object 114. For example, the manual calibration procedure prompted at block 622 may be performed later, such as after completing the additive manufacturing process for the object 114 currently being manufactured. Additionally, or in the alternative, the method 600 may continue with prompting further remedial action at block 630. The further remedial action may include reallocating an interlace region 154 of the build plane 130 as between a plurality of irradiation devices 138, 140, 400, prompting an maintenance event, and/or interrupting additive manufacturing of the three-dimensional object 114, such as until the manual calibration and/or the maintenance event can be performed.

Figure 7:
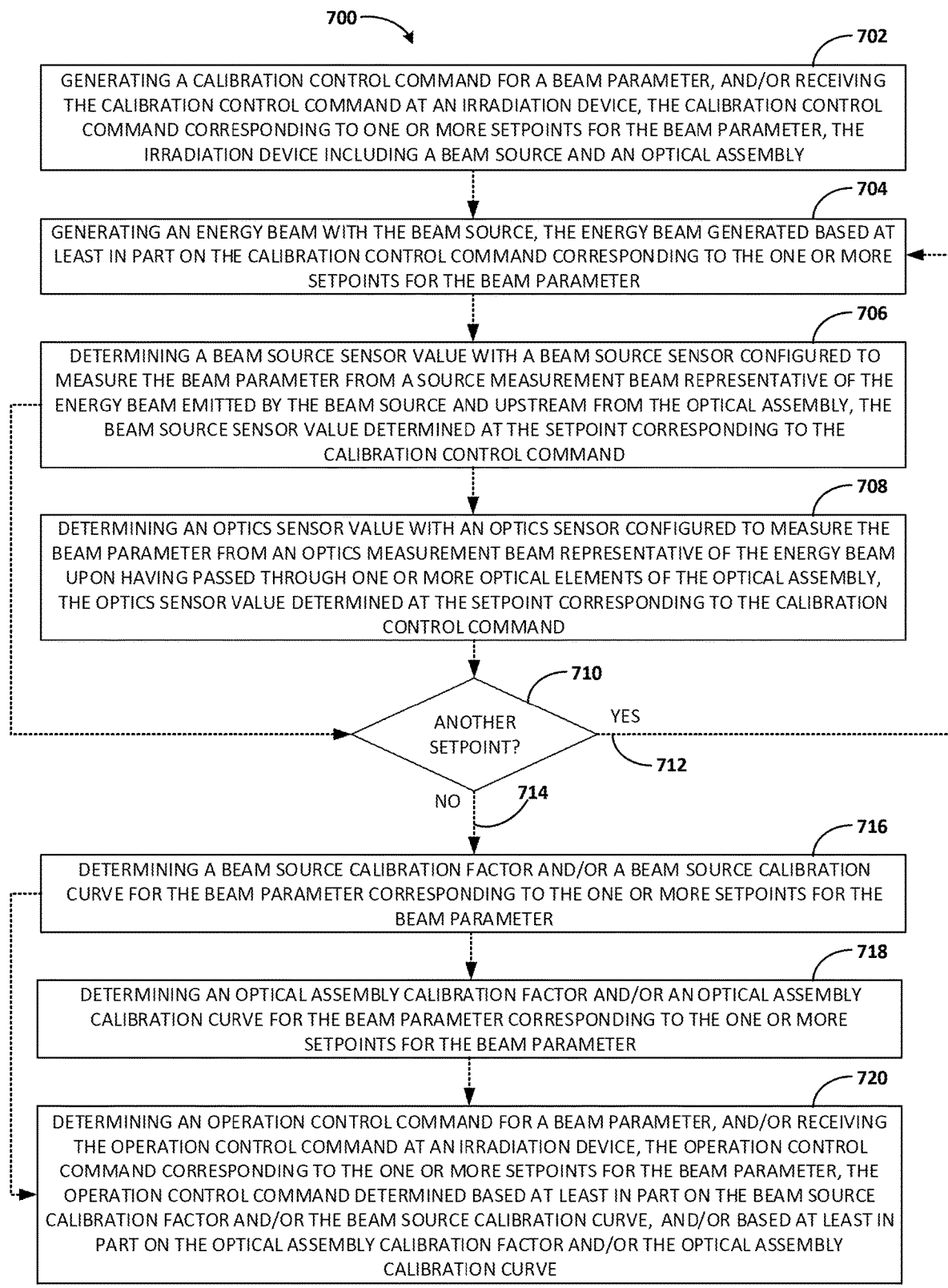
FIG. 7 schematically depicts another exemplary method of additively manufacturing a three-dimensional object.

Now turning to FIG. 7, another exemplary method 700 will be described. as shown, an exemplary method 700 may include, at block 702 generating a calibration control command for a beam parameter. The calibration control command may correspond to one or more setpoints for the beam parameter. The exemplary method 700 may additionally or alternatively include, at block 702, receiving the calibration control command at an irradiation device 138, 140. The irradiation device may include a beam source 200 and an optical assembly 202. In some embodiments, the exemplary method 700 may be performed with respect to an irradiation parameter and/or with respect to an optical parameter. At block 704, an exemplary method 700 may include generating an energy beam 142, 148 with the beam source 200. The energy beam 142, 148 may be generated based at least in part on the calibration control command corresponding to the one or more setpoints for the beam parameter. The energy beam 142, 148 may be generated based at least in part on a calibration control command for an irradiation parameter and/or an optical parameter.

In some embodiments, an exemplary method 700 may include, at block 706, determining a beam source sensor value with a beam source sensor 206. The beam source sensor 206 may be configured to measure the beam parameter from a source measurement beam 216 representative of the energy beam 142, 148 emitted by the beam source 200 and upstream from the optical assembly 202. The beam source sensor value may be determined at the setpoint corresponding to the calibration control command. Additionally, or in the alternative, an exemplary method 700 may include, at block 708, determining an optics sensor value with an optics sensor 208. The optics sensor 208 may be configured to measure the beam parameter from an optics measurement beam 220 representative of the energy beam 142, 148 upon having passed through one or more optical elements of the optical assembly 202. The optics sensor value may be determined at the setpoint corresponding to the calibration control command At block 710, an exemplary method 700 may include determining whether another setpoint exists. For example, the exemplary method 700 may be determined with respect to one or more setpoints. In some embodiments, a calibration factor may be determined from one setpoint; however, a plurality of setpoints may also be used to determine a calibration factor. Additionally, or in the alternative, a calibration curve may be determined from a plurality of setpoints. In some embodiments, an exemplary method 700 may include, at block 716, determining a beam source calibration factor and/or a beam source calibration curve for the beam parameter corresponding to the one or more setpoints for the beam parameter. Additionally, or in the alternative, an exemplary method 700 may include, at block 718, determining an optical assembly calibration factor and/or an optical assembly calibration curve for the beam parameter corresponding to the one or more setpoints for the beam parameter.

In some embodiments, an exemplary method 700 may include, at block 720, determining an operation control command for a beam parameter. Additionally, or in the alternative, an exemplary method 700 may include receiving the operation control command at an irradiation device 138, 140. The operation control command may correspond to the one or more setpoints for the beam parameter. The operation control command may be determined based at least in part on the beam source calibration factor and/or the beam source calibration curve. Additionally, or in the alternative, the operation control command may be determined based at least in part on the optical assembly calibration factor and/or the optical assembly calibration curve.

Figure 8A:
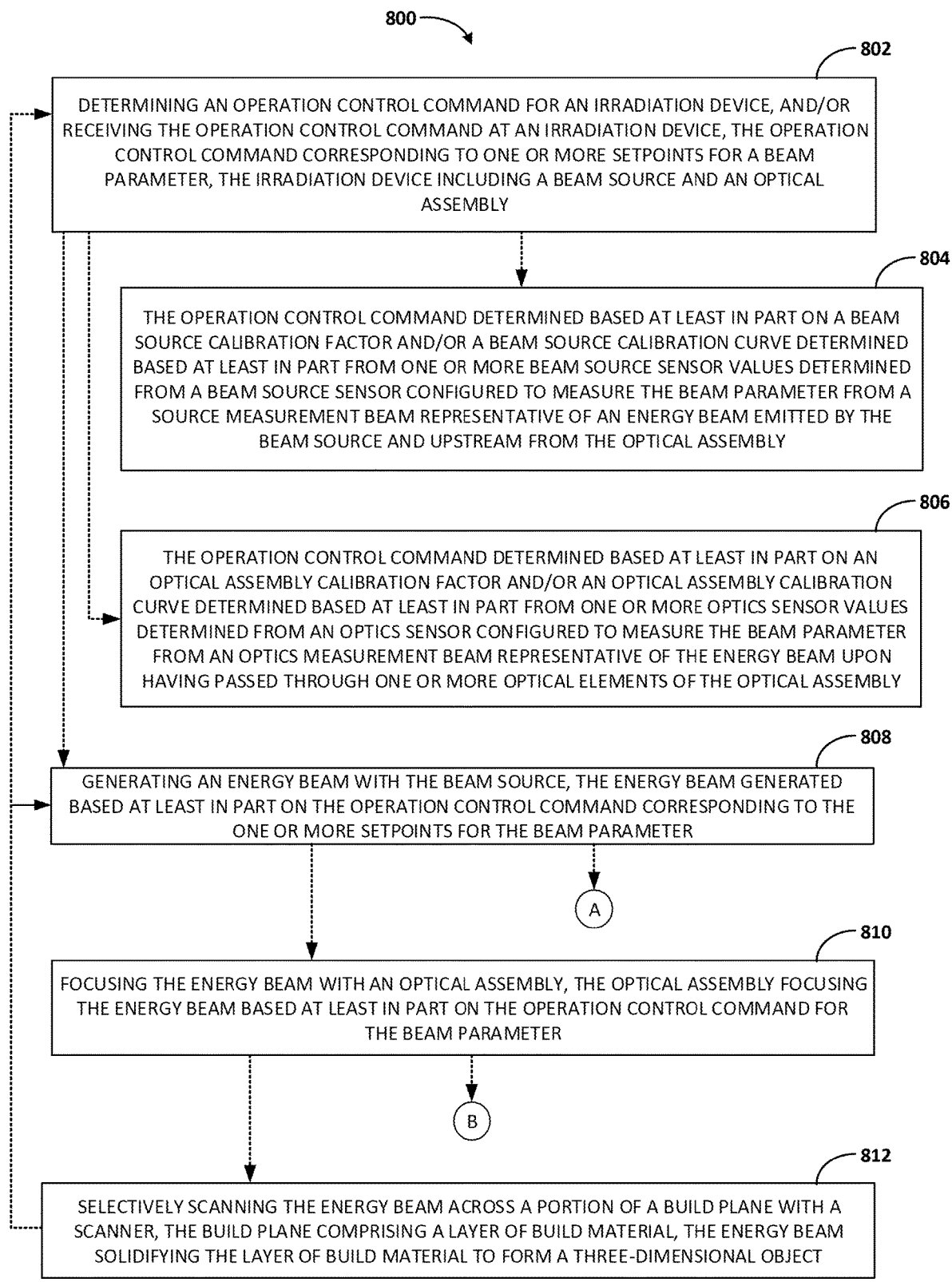
FIGS. 8A and 8B schematically depict yet another exemplary method of additively manufacturing a three-dimensional object.

Now turning to FIGS. 8A and 8B, another exemplary method 800 will be described. As shown in FIG. 8A, an exemplary method 800 may include, at block 802, determining an operation control command for an irradiation device. The operation control command may correspond to one or more setpoints for a beam parameter, such as an irradiation parameter and/or an optical parameter. Additionally, or in the alternative, an exemplary method 800 may include, at block 802, receiving the operation control command at an irradiation device 138, 140. The irradiation device 138, 140 may include a beam source 200 and an optical assembly 202.

In some embodiments, as shown at block 804, the operation control command may be determined based at least in part on a beam source calibration factor and/or a beam source calibration curve. The beam source calibration factor and/or beam source calibration curve may be determined based at least in part from one or more beam source sensor values determined from a beam source sensor 206 associated with the beam source 200. For example, the beam source sensor 206 may be configured to measure the beam parameter from a source measurement beam 216 representative of an energy beam 142, 148 emitted by the beam source 200 and upstream from the optical assembly 202. Additionally, or in the alternative, as shown at block 806, the operation control command may be determined based at least in part on an optical assembly calibration factor and/or an optical assembly calibration curve. The optical assembly calibration factor and/or optical assembly calibration curve may be determined based at least in part from one or more optics sensor values determined from an optics sensor 208 associated with the optical assembly 202. For example, the optics sensor 208 may be configured to measure the beam parameter from an optics measurement beam 220 representative of the energy beam 142, 148 upon having passed through one or more optical elements of the optical assembly 202.

At block 808, an exemplary method 800 may include generating an energy beam 142, 148 with the beam source 200. The energy beam 142, 148 may be generated based at least in part on the operation control command corresponding to the one or more setpoints for the beam parameter. An exemplary method 800 may include, at block 810, focusing the energy beam 142, 148 with an optical assembly 202. The optical assembly 202 may be configured to focus the energy beam 142, 148 based at least in part on the operation control command for the beam parameter. At block 812, an exemplary method 800 may include selectively scanning the energy beam 142, 148 across a portion of a build plane 130 with a scanner 204. The build plane 130 may include a layer of build material 136. The energy beam 142, 148 may solidify the layer of build material 136 to form a three-dimensional object 114, such as by melting and/or sintering the build material at portions of the build plane 130 traversed by a scan path of the energy beam 142, 148.

Figure 8B:
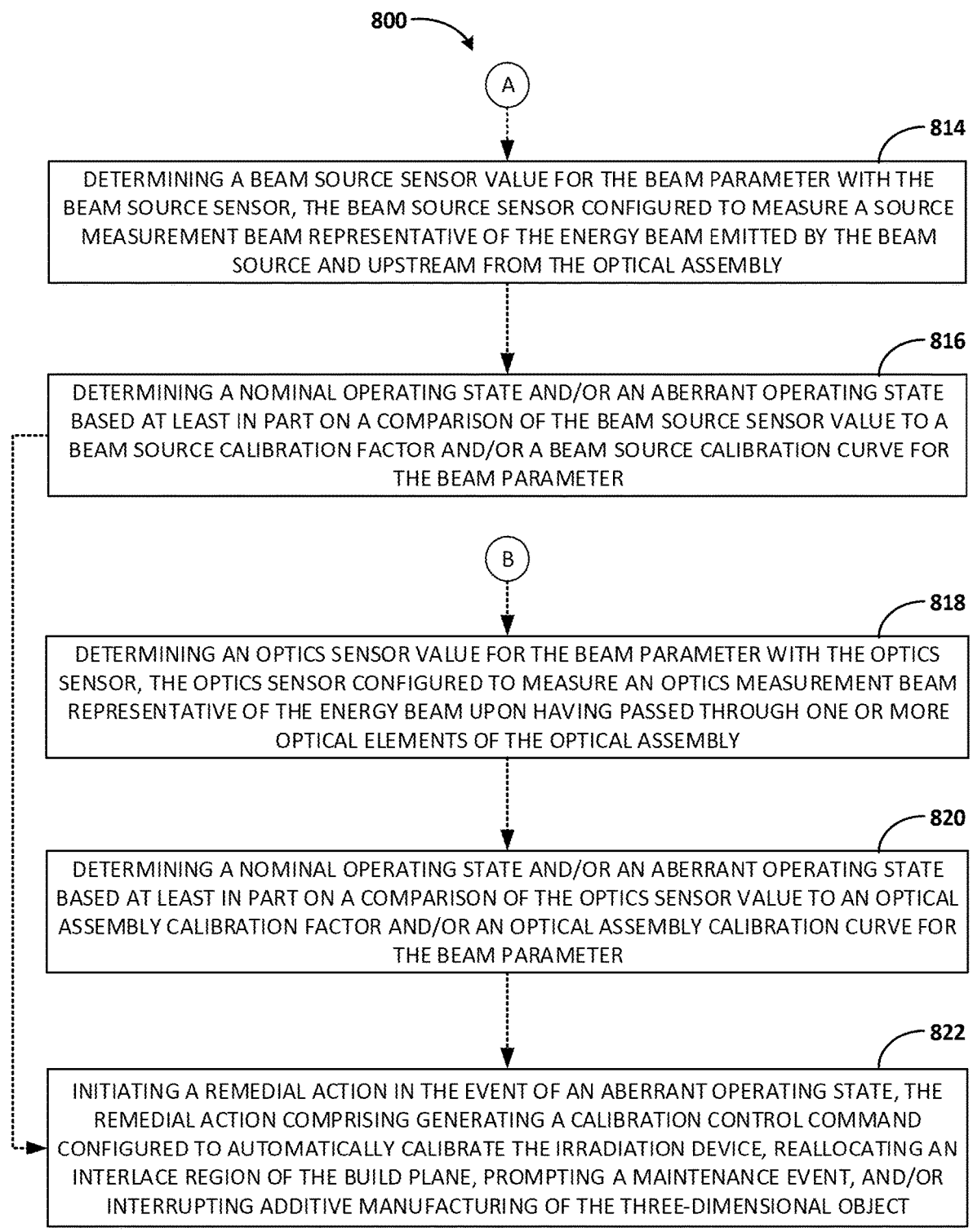

As shown in FIG. 8B, in some embodiments, an exemplary method 800 may include, at block 814, determining a beam source sensor value for the beam parameter with the beam source sensor 206. The beam source sensor 206 may be configured to measure a source measurement beam 216 representative of the energy beam 142, 148 emitted by the beam source 200 and upstream from the optical assembly 202. At block 816, an exemplary method 800 may include determining a nominal operating state and/or an aberrant operating state based at least in part on a comparison of the beam source sensor value to a beam source calibration factor and/or a beam source calibration curve for the beam parameter.

Additionally, or in the alternative, an exemplary method 800 may include, at block 818, determining an optics sensor value for the beam parameter with an optics sensor 208. The optics sensor 208 may be configured to measure an optics measurement beam 220 representative of the energy beam 142, 148 upon having passed through one or more optical elements of the optical assembly 202. At block 820, an exemplary method 800 may include determining a nominal operating state and/or an aberrant operating state based at least in part on a comparison of the optics sensor value to an optical assembly calibration factor and/or an optical assembly calibration curve for the beam parameter.

In some embodiments, an exemplary method 800 may include, at block 822, initiating a remedial action in the event of an aberrant operating state. The remedial action may include generating a calibration control command configured to automatically calibrate the irradiation device. Additionally, or in the alternative, the remedial action may include reallocating an interlace region 154 of the build plane 130 as between a plurality of irradiation devices 138, 140. Additionally, or in the alternative, the remedial action may include prompting a maintenance event, and/or interrupting additive manufacturing of the three-dimensional object.

Further aspects of the invention are provided by the subject matter of the following clauses:

1. An additive manufacturing system, the additive manufacturing system comprising: an additive manufacturing machine and a control system; wherein the additive manufacturing machine comprises: one or more irradiation devices, the one or more irradiation devices respectively comprising: a beam source configured to emit an energy beam, an optical assembly comprising one or more optical elements configured to focus the energy beam emitted by the beam source, a beam source sensor configured to determine a beam source sensor value from a source measurement beam representative of the energy beam prior to the energy beam passing through one or more optical elements of the optical assembly, and an optics sensor configured to determine an optics sensor value from an optics measurement beam representative of the energy beam downstream from the one or more optical elements of the optical assembly; and wherein the control system comprises: an irradiation control module configured to provide one or more control commands to the additive manufacturing machine based at least in part on the beam source sensor value and/or based at least in part on the optics sensor value.

2. The system of any preceding clause, wherein the one or more irradiation devices comprises: a source measurement beam splitter configured to split a portion of the energy beam emitted from the energy beam source to provide the source measurement beam to the beam source sensor; and/or an optics measurement beam splitter configured to split a portion of the energy beam downstream from the one or more optical elements of the optical assembly to provide the optics measurement beam to the optics sensor.

3. The system of any preceding clause, wherein the one or more irradiation devices comprises: a scanner configured to selectively scan the energy beam focused by the optical assembly across a build plane based at least in part on the one or more control commands.

4. The system of any preceding clause, wherein the additive manufacturing machine and/or the control system are configured to perform a method of additively manufacturing a three-dimensional object, comprising: determining a calibration control command for a beam parameter, the calibration control command corresponding to one or more setpoints for the beam parameter, the one or more irradiation devices; generating the energy beam with the beam source based at least in part on the calibration control command corresponding to one or more setpoints for the beam parameter; determining a beam source sensor value with the beam source sensor; determining a beam source calibration factor and/or a beam source calibration curve for the beam parameter corresponding to the one or more setpoints for the beam parameter; determining an optics sensor value with the optics sensor; determining an optical assembly calibration factor and/or an optical assembly calibration curve for the beam parameter corresponding to the one or more setpoints for the beam parameter; and determining an operation control command for the beam parameter, the operation control command corresponding to the one or more setpoints for the beam parameter, the operation control command determined based at least in part on the beam source calibration factor and/or the beam source calibration curve, and the operation control command determined based at least in part on the optical assembly calibration factor and/or the optical assembly calibration curve.

5. The system of any preceding clause, wherein the additive manufacturing machine and/or the control system are configured to perform a method of additively manufacturing a three-dimensional object, comprising: determining an operation control command for the one or more irradiation devices, the operation control command corresponding to one or more setpoints for a beam parameter; generating the energy beam with the beam source, the energy beam generated based at least in part on the operation control command corresponding to the one or more setpoints for the beam parameter; and selectively scanning the energy beam across a portion of the build plane with a scanner, the build plane including a layer of build material, and the energy beam solidifying the layer of build material to form a portion of a three-dimensional object; wherein the operation control command is determined based at least in part on a beam source calibration factor and/or a beam source calibration curve determined based at least in part from a beam source sensor value determined from the beam source sensor, and wherein the operation control command is determined based at least in part on an optical assembly calibration factor and/or an optical assembly calibration curve determined based at least in part from an optics sensor value determined from the optics sensor.

6. The system of any preceding clause, wherein the beam parameter comprises: an irradiation parameter, the irradiation parameter including or pertaining to beam power, intensity, intensity profile, spot size, and/or spot shape; and/or an optical parameter, the optical parameter including or pertaining to focal length, parallelism, angle tolerance, power error, irregularity, surface finish, index of refraction, and/or Abbe number.

7. A method of additively manufacturing a three-dimensional object, the method, comprising: determining an operation control command for an irradiation device, the operation control command corresponding to one or more setpoints for a beam parameter, the irradiation device comprising a beam source and an optical assembly; generating an energy beam with the beam source, the energy beam generated based at least in part on the operation control command corresponding to the one or more setpoints for the beam parameter; and selectively scanning the energy beam across a portion of a build plane with a scanner, the build plane including a layer of build material, and the energy beam solidifying the layer of build material to form a portion of a three-dimensional object; wherein the operation control command is determined based at least in part on a beam source calibration factor and/or a beam source calibration curve determined based at least in part from a beam source sensor value determined from a beam source sensor associated with the beam source, and wherein the operation control command is determined based at least in part on an optical assembly calibration factor and/or an optical assembly calibration curve determined based at least in part from an optics sensor value determined from an optics sensor associated with the optical assembly.

8. The method of any preceding clause, comprising: focusing the energy beam with the optical assembly, the optical assembly configured to focus the energy beam based at least in part on the operation control command for the beam parameter.

9. The method of any preceding clause, wherein the beam source sensor is configured to measure the beam parameter from a source measurement beam representative of the energy beam emitted by the beam source and upstream from the optical assembly.

10. The method of any preceding clause, wherein the optics sensor is configured to measure the beam parameter from an optics measurement beam representative of the energy beam upon having passed through one or more optical elements of the optical assembly.

11. The method of any preceding clause, comprising: determining the beam source sensor value for the beam parameter with the beam source sensor, the beam source sensor configured to measure a source measurement beam representative of the energy beam emitted by the beam source and upstream from the optical assembly.

12. The method of any preceding clause, comprising: determining a nominal operating state and/or an aberrant operating state based at least in part on a comparison of the beam source sensor value to the beam source calibration factor and/or the beam source calibration curve for the beam parameter.

13. The method of any preceding clause, comprising: determining the optics sensor value for the beam parameter with the optics sensor, the optics sensor configured to measure an optics measurement beam representative of the energy beam upon having passed through one or more optical elements of the optical assembly.

14. The method of any preceding clause, comprising: determining a nominal operating state and/or an aberrant operating state based at least in part on a comparison of the optics sensor value to the optical assembly calibration factor and/or the optical assembly calibration curve for the beam parameter.

15. The method of any preceding clause, comprising: initiating a remedial action in the event of an aberrant operating state, the aberrant, the aberrant operating state determined based at least in part on a comparison of the beam source sensor value to the beam source calibration factor and/or the beam source calibration curve for the beam parameter, and/or based at least in part on a comparison the optics sensor value to the optical assembly calibration factor and/or the optical assembly calibration curve for the beam parameter; wherein the remedial action comprises: generating a calibration control command configured to automatically calibrate the irradiation device; reallocating an interlace region of the build plane as between the irradiation device and at least another irradiation device; prompting a maintenance event; and/or interrupting additive manufacturing of the three-dimensional object.

16. The method of any preceding clause, wherein the beam parameter comprises: an irradiation parameter, the irradiation parameter including or pertaining to beam power, intensity, intensity profile, spot size, and/or spot shape; and/or an optical parameter, the optical parameter including or pertaining to focal length, parallelism, angle tolerance, power error, irregularity, surface finish, index of refraction, and/or Abbe number.

17. The method of any preceding clause, comprising: measuring the beam parameter from a source measurement beam representative of the energy beam emitted by the beam source and upstream from the optical assembly, the beam source and the optical assembly defining at least a portion of the irradiation device; measuring an additional beam parameter from an additional source measurement beam representative of an additional energy beam emitted by an additional beam source and upstream from an additional optical assembly, the additional beam source and the additional optical assembly defining at least a portion of an additional irradiation device, the irradiation device and the additional irradiation device defining at least a portion of an energy beam system; and determining, based at least in part on a comparison of the beam parameter associated with the irradiation device to the additional beam parameter associated with the additional irradiation device: the operation control command, the beam source calibration factor and/or the beam source calibration curve, and/or the optical assembly calibration factor and/or the optical assembly calibration curve; wherein the comparison of the beam parameter associated with the irradiation device to the additional beam parameter associated with the additional irradiation device comprises characterizing operational variability, aging, degradation, and/or damage associated with the irradiation device and/or the additional irradiation device.

18. A method of additively manufacturing a three-dimensional object, the method comprising: determining a calibration control command for a beam parameter, the calibration control command corresponding to one or more setpoints for the beam parameter, the irradiation device comprising a beam source and an optical assembly; generating an energy beam with the beam source based at least in part on the calibration control command corresponding to one or more setpoints for the beam parameter; determining a beam source sensor value with a beam source sensor configured to measure the beam parameter from a source measurement beam representative of the energy beam emitted by the beam source and upstream from the optical assembly; determining a beam source calibration factor and/or a beam source calibration curve for the beam parameter corresponding to the one or more setpoints for the beam parameter; determining an optics sensor value with an optics sensor configured to measure the beam parameter from an optics measurement beam representative of the energy beam upon having passed through one or more optical elements of the optical assembly; determining an optical assembly calibration factor and/or an optical assembly calibration curve for the beam parameter corresponding to the one or more setpoints for the beam parameter; and determining an operation control command for the beam parameter, the operation control command corresponding to the one or more setpoints for the beam parameter, the operation control command determined based at least in part on the beam source calibration factor and/or the beam source calibration curve, and the operation control command determined based at least in part on the optical assembly calibration factor and/or the optical assembly calibration curve.

19. The method of any preceding clause, comprising: determining the optics sensor value at a plurality of setpoints or the beam parameter, and determining the optical assembly calibration curve for the beam parameter corresponding to the plurality of setpoints for the beam parameter; and/or determining the beam source sensor value at a plurality of setpoints or the beam parameter, and determining the beam source calibration curve for the beam parameter corresponding to the plurality of setpoints for the beam parameter.

20. The method of any preceding clause, wherein the beam parameter comprises: an irradiation parameter, the irradiation parameter including or pertaining to beam power, intensity, intensity profile, spot size, and/or spot shape; and/or an optical parameter, the optical parameter including or pertaining to focal length, parallelism, angle tolerance, power error, irregularity, surface finish, index of refraction, and/or Abbe number.

21. The method of any preceding clause, comprising: performing the method using the system of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing system, the additive manufacturing system comprising:
an additive manufacturing machine and a control system;
wherein the additive manufacturing machine comprises:
one or more irradiation devices, the one or more irradiation devices respectively comprising:
a beam source configured to emit an energy beam,
an optical assembly comprising one or more optical elements configured to focus the energy beam emitted by the beam source,
a beam source sensor configured to determine a beam source sensor value from a source measurement beam representative of the energy beam prior to the energy beam passing through one or more optical elements of the optical assembly, and an optics sensor configured to determine an optics sensor value from an optics measurement beam representative of the energy beam downstream from the one or more optical elements of the optical assembly; and wherein the control system comprises:

an irradiation control module configured to provide one or more control commands to the additive manufacturing machine based at least in part on the beam source sensor value and/or based at least in part on the optics sensor value; and wherein the one or more irradiation devices comprises:

a source measurement beam splitter configured to split a portion of the energy beam emitted from the energy beam source to provide the source measurement beam to the beam source sensor; and an optics measurement beam splitter configured to split a portion of the energy beam downstream from the one or more optical elements of the optical assembly to provide the optics measurement beam to the optics sensor.

2. The system of claim 1, wherein the one or more irradiation devices comprises:

a scanner configured to selectively scan the energy beam focused by the optical assembly across a build plane based at least in part on the one or more control commands.

3. The system of claim 1, wherein the control system is configured to determine a calibration control command for a beam parameter, the calibration control command corresponding to one or more setpoints for the beam parameter;

the beam source is configured to generate the energy beam based at least in part on the calibration control command corresponding to one or more setpoints for the beam parameter;

the control system is configured to determine a beam source calibration factor and/or a beam source calibration curve for the beam parameter corresponding to the one or more setpoints for the beam parameter;

the control system is configured to determine an optical assembly calibration factor and/or an optical assembly calibration curve for the beam parameter corresponding to the one or more setpoints for the beam parameter; and the control system is configured to determine an operation control command for the beam parameter based at least in part on the beam source calibration factor and/or the beam source calibration curve, and based at least in part on the optical assembly calibration factor and/or the optical assembly calibration curve.

4. The system of claim 1, wherein the control system is configured to determine an operation control command for the one or more irradiation devices, the operation control command corresponding to one or more setpoints for a beam parameter;

the beam source is configured to generate the energy beam based at least in part on the operation control command corresponding to the one or more setpoints for the beam parameter;

the system further comprises a scanner configured to selectively scan the energy beam across a portion of a build plane including a layer of build material, and the energy beam being configured to solidify the layer of build material to form a portion of a three-dimensional object; and wherein the control system is configured to determine the operation control command based at least in part on a beam source calibration factor and/or a beam source calibration curve determined based at least in part from the beam source sensor value, and based at least in part on an optical assembly calibration factor and/or an optical assembly calibration curve determined based at least in part from the optics sensor value.

5. The system of claim 4, wherein the beam parameter comprises:

an irradiation parameter, the irradiation parameter including or pertaining to beam power, intensity, intensity profile, spot size, and/or spot shape; and/or an optical parameter, the optical parameter including or pertaining to focal length, parallelism, angle tolerance, power error, irregularity, surface finish, index of refraction, and/or Abbe number.

* * * * *